US009603186B2

(12) United States Patent
Jain et al.

(10) Patent No.: US 9,603,186 B2
(45) Date of Patent: Mar. 21, 2017

(54) MOBILITY MANAGEMENT ENTITY, USER EQUIPMENT AND METHODS FOR MACHINE TYPE COMMUNICATION

(71) Applicant: Intel IP Corporation, Santa Clara, CA (US)

(72) Inventors: Puneet Jain, Hillsboro, OR (US); Sangeetha L. Bangolae, Beaverton, OR (US); Marta Martinez Tarradell, Hillsboro, OR (US)

(73) Assignee: Intel IP Corporation, Santa Clara, CA (US)

( * ) Notice: Subject to any disclaimer, the term of this patent is extended or adjusted under 35 U.S.C. 154(b) by 109 days.

(21) Appl. No.: 14/571,025

(22) Filed: Dec. 15, 2014

(65) Prior Publication Data

US 2015/0327327 A1     Nov. 12, 2015

Related U.S. Application Data

(60) Provisional application No. 61/990,686, filed on May 8, 2014.

(51) Int. Cl.
*H04W 76/06*     (2009.01)
*H04W 76/02*     (2009.01)
(Continued)

(52) U.S. Cl.
CPC ....... *H04W 76/068* (2013.01); *H04W 76/066* (2013.01); *H04W 4/005* (2013.01);
(Continued)

(58) Field of Classification Search
CPC . H04W 4/005; H04W 74/0833; H04W 88/06; H04W 24/02; H04W 76/021; H04W 88/16
See application file for complete search history.

(56) References Cited

U.S. PATENT DOCUMENTS 9,025,610 B2 * 5/2015 Qu ................. H04L 12/1407
370/401
2011/0280184 A1    11/2011 Diachina et al.
(Continued)

FOREIGN PATENT DOCUMENTS

WO    WO-2014013057 A1    1/2014
WO    WO-2015171242 A1    11/2015

OTHER PUBLICATIONS

LTE Radio Layer 2, RRC and Radio Access Network Architecture, 3GPP TSG-RAN WG2, REV-090004, Arnaud Meylan.*
(Continued)

*Primary Examiner* — Xavier S. Wong
(74) *Attorney, Agent, or Firm* — Schwegman Lundberg & Woessner, P.A.

(57) ABSTRACT

Embodiments of a Mobility Management Entity (MME) to support packet-switched (PS) services in a network in accordance with Evolved Packet System (EPS) bearers are disclosed herein. The MME may receive, from a User Equipment (UE), an indicator of Machine Type Communication (MTC) operation, which may indicate that the UE operates as an MTC UE. The MME may, at least partly in response to a determination of UE inactivity on an EPS bearer, transmit a bearer release message for release of an S5/S8 bearer included in the EPS bearer. In some embodiments, the indicator of MTC operation may include a permission indicator from the UE for the release of the S5/S8 bearer. In some embodiments, the indicator of MTC operation may include an indicator of transmission of small blocks of data or transmission at an infrequent rate.

26 Claims, 11 Drawing Sheets

(51) Int. Cl.
  *H04W 88/16* (2009.01)
  *H04W 80/04* (2009.01)
  *H04W 4/00* (2009.01)
(52) U.S. Cl.
  CPC ............ *H04W 76/02* (2013.01); *H04W 80/04* (2013.01); *H04W 88/16* (2013.01)

(56) References Cited

U.S. PATENT DOCUMENTS

| | | | | |
|---|---|---|---|---|
| 2012/0252481 | A1* | 10/2012 | Anpat | H04W 8/06 455/456.1 |
| 2012/0282956 | A1 | 11/2012 | Kim et al. | |
| 2013/0182644 | A1* | 7/2013 | Kim | H04W 76/025 370/328 |
| 2015/0223284 | A1* | 8/2015 | Jain | H04L 1/1864 370/329 |
| 2015/0327170 | A1* | 11/2015 | Kim | H04W 52/0216 455/574 |
| 2016/0044002 | A1* | 2/2016 | Ying | H04L 9/14 713/168 |

OTHER PUBLICATIONS

"Handling of MME UE S1AP ID in case of S1 release", S2-141073, SA WG2 Meeting #102, [Online]. Retrieved from the Internet: <http://www.3gpp.org/ftp/tsg_sa/WG2_Arch/TSGS2_102_Malta/Docs/S2-141073.zip>, (Mar. 18, 2014).

"International Application Serial No. PCT/US2015/024878, International Search Report mailed Jul. 21, 2015", 3 pgs.

"International Application Serial No. PCT/US2015/024878, Written Opinion mailed Jul. 21, 2015", 5 pgs.

Huawei, et al., "Correction of possible PGW actions during PDN connection termination", S2-141303, SA WG2 Meeting #102, [Online]. Retrieved from the Internet: <http://www.3gpp.org/ftp/tsg_sa/WG2_Arch/TSGS2_102_Malta/Docs/S2-141303.zip>, (Mar. 28, 2014).

* cited by examiner

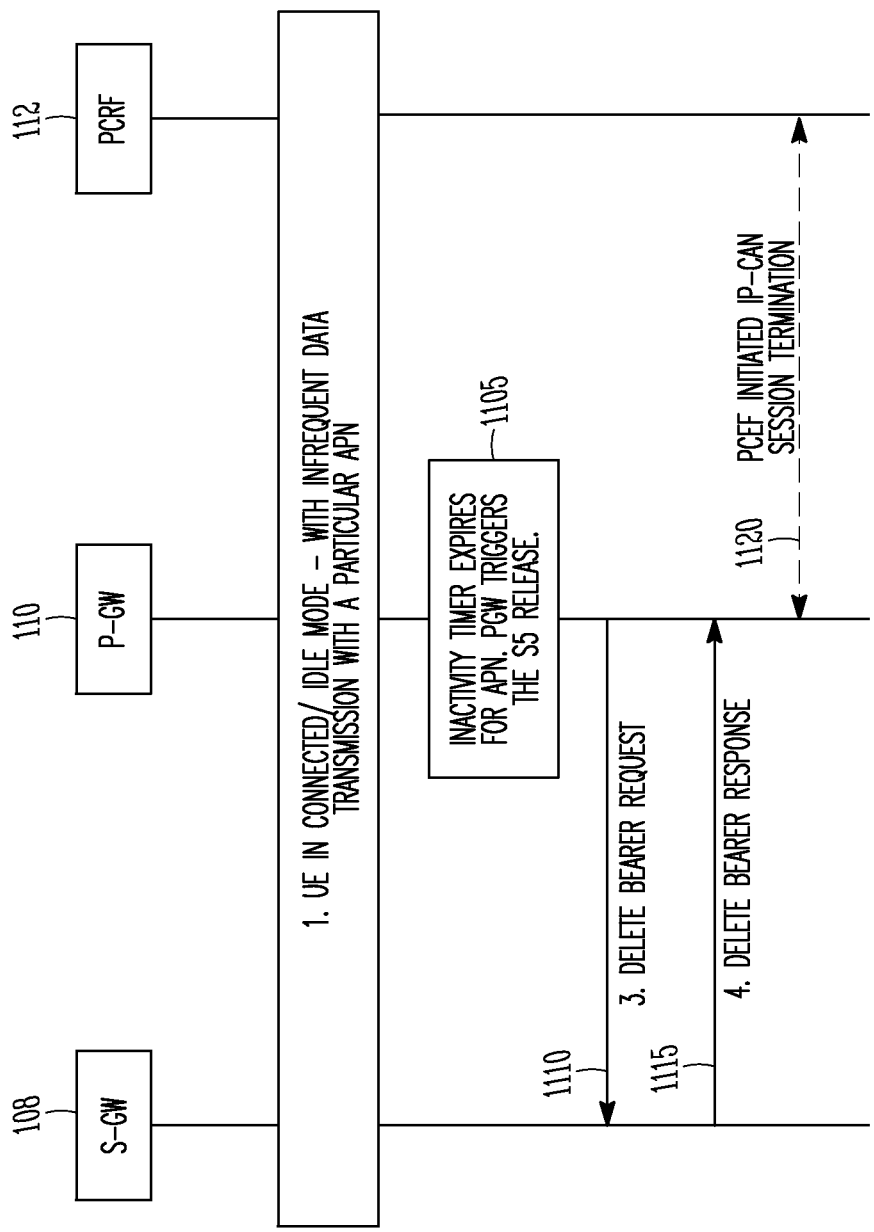

MOBILITY MANAGEMENT ENTITY, USER EQUIPMENT AND METHODS FOR MACHINE TYPE COMMUNICATION

PRIORITY CLAIM

This application claims priority under 35 USC 119(e) to U.S. Provisional Patent Application Ser. No. 61/990,686 filed May 8, 2014 [reference number P67699Z] which is incorporated herein by reference in its entirety.

TECHNICAL FIELD

Embodiments pertain to wireless communications. Some embodiments relate to cellular communication networks including LTE networks. Some embodiments relate to Machine Type Communication (MTC). Some embodiments relate to communication over Evolved Packet System (EPS) bearers or other bearers.

BACKGROUND

In comparison to some mobile devices such as smartphones, devices that support Machine Type Communication (MTC) may transmit relatively small blocks of data at relatively infrequent rates and may also spend long periods of time in a sleep mode. Although a mobile network may be able to support MTC devices, such operation may be inefficient in some cases. For instance, the network may be designed or configured for high throughput with nearly constant connectivity, which may provide efficient operation for traditional services typically associated with smartphones. However, support of MTC devices in such a framework may be inefficient, especially for a large number of MTC devices. Accordingly, there is a general need for methods and techniques for supporting MTC devices in mobile networks, and particularly a large number of MTC devices.

BRIEF DESCRIPTION OF THE DRAWINGS

FIG. 11 illustrates another example of a bearer release in accordance with some embodiments;

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
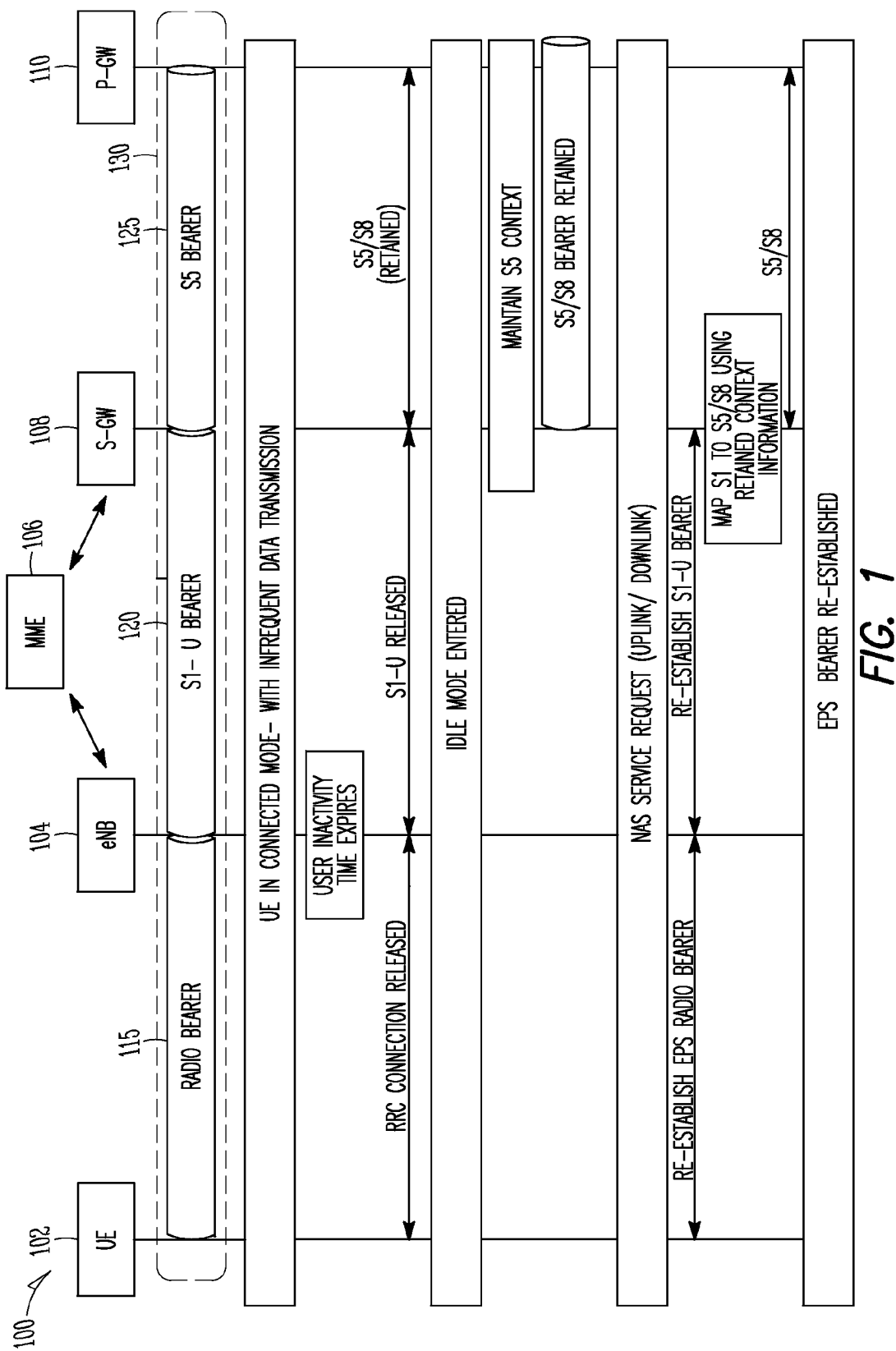
FIG. 1 is a functional diagram of a 3GPP network in accordance with some embodiments.

FIG. 1 is a functional diagram of a 3GPP network in accordance with some embodiments. The network 100 may include one or more Evolved Node-Bs (eNBs) 104, which may operate as base stations, and may support one or more User Equipments (UEs) 102 or mobile devices. The network 100 may also include a Mobility Management Entity (MME) 106, which may manage mobility aspects in access such as gateway selection and tracking area list management. The network 100 may also include a Serving Gateway (SGW) 108, which may be a local mobility anchor point for inter-eNB handovers and also may provide an anchor for inter-3GPP mobility. Other responsibilities of the SGW 108 may include lawful intercept, charging, and some policy enforcement. The network 100 may further include a Packet Data Network Gateway (PGW) 110, which may route data packets between the network 100 and external networks, and may be a key node for policy enforcement and charging data collection. The PGW 110 may also provide an anchor point for mobility with non-LTE accesses. In some embodiments, the SGW 108 and the MME 106 may be implemented in one physical node or separate physical nodes. In some embodiments, the PGW 110 and SGW 108 may be implemented in one physical node or separated physical nodes.

For packet-switched (PS) services, an Evolved Packet System (EPS) bearer 130 may be established for communication between the PGW 110 and the UE 102. That is, the UE 102 may attach itself to the EPS bearer 130 to receive PS services that may require registration. The EPS bearer 130 may include a radio bearer 115 for exchanging packets between the eNB 104 and UE 102, an S1 bearer 120 for exchanging packets between the eNB 104 and the SGW 108, and an S5/S8 bearer 125 for exchanging packets between the SGW 108 and the PGW 110. It should be noted that an S5 bearer may be associated with a home operator and an S8 bearer may be associated with a visiting operator. Throughout this disclosure, discussion or references to one of the S5 or S8 bearers may also apply to the other bearer in some embodiments, and discussion or references to an "S5/S8 bearer" may also apply to either type of bearer.

The S5/S8 bearer 125 may be an "always-on" bearer in some cases, and such a mode of operation may be part of a default mode. As an example, the UE 102 may enter a Radio Resource Control (RRC) idle mode due to inactivity, which may be determined at the eNB 104 when an RRC inactivity timer expires. In response, the radio bearer 115 and S1 bearer 120 may be released. However, the S5/S8 bearer 125 may still be retained to provide always-on operation, in particular to provide low delay transmission of data to the UE 102 when such data arrives at the PGW 110. When the UE 102 returns to an RRC connected mode, the radio bearer 115 and S1 bearer 120 may be re-established, and the re-establishment may be done for each UE 102 on a per-UE basis. The re-establishment may be performed using a Non-Access Stratum (NAS) Service Request in some cases.

In some embodiments, the eNB 104 may fulfill various logical functions for the network 100 including but not limited to RNC (radio network controller functions) such as radio bearer management, uplink and downlink dynamic radio resource management and data packet scheduling, and mobility management. In accordance with embodiments, UEs 102 may be configured to communicate OFDM communication signals with an eNB 104 over a multicarrier communication channel in accordance with an OFDMA communication technique. The OFDM signals may comprise a plurality of orthogonal subcarriers.

In accordance with some embodiments, the MME 106 may receive, as part of an establishment of the EPS bearer 130, an indicator of Machine Type Communication (MTC) operation at the UE 102. The MME 106 may also transmit a bearer release message to the SGW 108 for release of the S5/S8 bearer 125. The transmission may be performed in response to a determination, at the MME 106, of UE 102 inactivity on the EPS bearer 130. In some embodiments, the indicator of MTC operation may include an indicator of transmission of small blocks of data or transmission at an infrequent rate. These embodiments are described in more detail below.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block (RB) comprises a collection of resource elements (RE) in the frequency domain. An RE represents the smallest quanta of resources that currently can be allocated. There are several different physical downlink channels that are conveyed using such resource blocks.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and H-ARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

Figure 3:
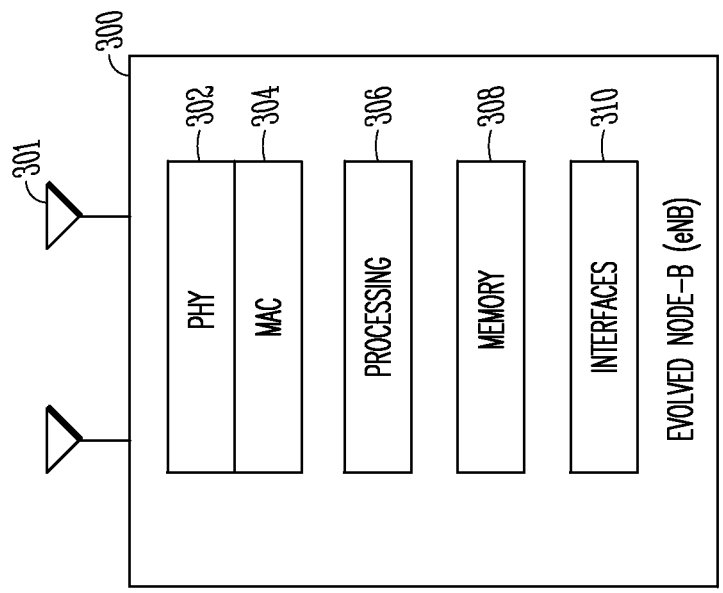
FIG. 3 is a functional diagram of an Evolved Node-B (eNB) in accordance with some embodiments.
Figure 2:
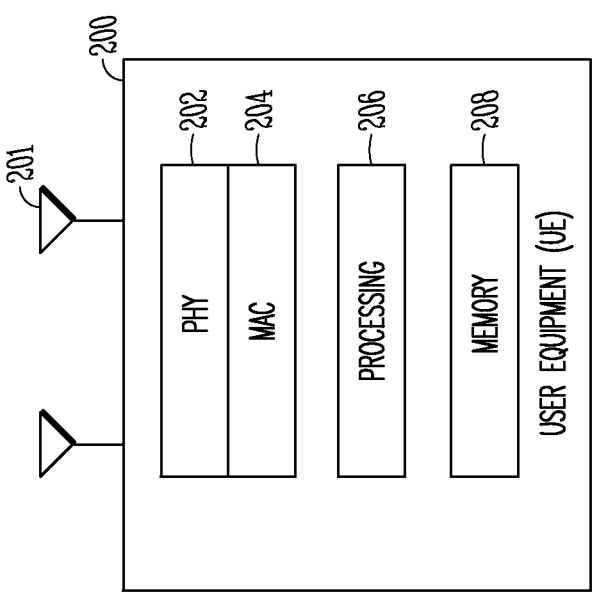
FIG. 2 is a functional diagram of a User Equipment (UE) in accordance with some embodiments.
Figure 4:
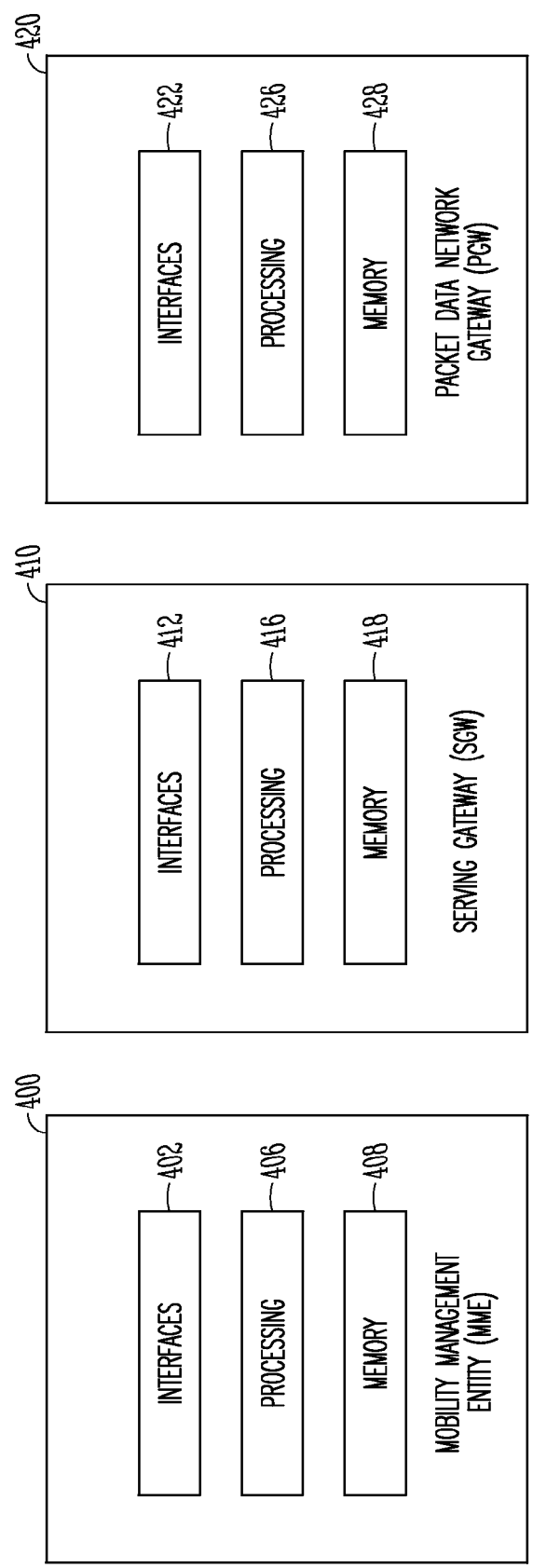
FIG. 4 illustrates functional diagrams for a Mobility Management Entity (MME), a Serving Gateway (SGW), and a Packet Data Network Gateway (PGW) in accordance with some embodiments.

FIG. 2 is a functional diagram of a User Equipment (UE) in accordance with some embodiments. FIG. 3 is a functional diagram of an Evolved Node-B (eNB) in accordance with some embodiments. FIG. 4 illustrates functional diagrams for a Mobility Management Entity (MME), a Serving Gateway (SGW), and a Packet Data Network Gateway (PGW) in accordance with some embodiments. It should be noted that in some embodiments, the eNB 300 may be a stationary non-mobile device. The UE 200 may be a UE 102 as depicted in FIG. 1, the eNB 300 may be an eNB 104 as depicted in FIG. 1, the MME 400 may be an MME 106 as depicted in FIG. 1, the SGW 410 may be an SGW 108 as depicted in FIG. 1, and the PGW 420 may be a PGW 110 as depicted in FIG. 1.

The UE 200 may include physical layer circuitry 202 for transmitting and receiving signals to and from the eNB 300, other eNBs, other UEs or other devices using one or more antennas 201, while the eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium. The UE 200 may also include processing circuitry 206 and memory 208 arranged to perform the operations described herein. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The MME 400 may include processing circuitry 406 and memory 408 arranged to perform the operations described herein, and may include one or more interfaces 402 that may enable wireless or wired communication with other components in the network 100 or other components. The SGW 410 may include processing circuitry 416 and memory 418 arranged to perform the operations described herein, and may include one or more interfaces 412 that may enable wireless or wired communication with other components in the network 100 or other components. The PGW 420 may include processing circuitry 426 and memory 428 arranged to perform the operations described herein, and may include one or more interfaces 422 that may enable wireless or wired communication with other components in the network 100 or other components.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device may include one or more of a keyboard, a display, a non-volatile memory port, multiple antennas, a graphics processor, an application processor, speakers, and other mobile device elements. The display may be an LCD screen including a touch screen. In some embodiments, the mobile device or other device can be the UE 200 or eNB 300 configured to operate in accordance with 3GPP standards.

Accordingly, the UE 200 may be configured to transmit an indicator of Machine Type Communication (MTC) operation at the UE 102. The indicator of MTC operation may enable a release of an S5/S8 bearer 125 in response to a release of a radio bearer 115 or an S1 bearer 120. These embodiments will be described in more detail below. In some embodiments, the mobile device or other device may be configured to operate according to other protocols or standards, including IEEE 802.11 or other IEEE standards.

The antennas 201, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 201, 301 may be effectively separated to take advantage of spatial diversity and the different channel characteristics that may result.

Although the UE 200, eNB 300, MME 400, SGW 410, and PGW 420 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

In accordance with embodiments, the MME 106 may receive, as part of an establishment of the EPS bearer 130 between the UE 102 and the PGW 110, an indicator of Machine Type Communication (MTC) operation. The indicator of Machine Type Communication (MTC) operation may indicate that the UE operates as an MTC UE 102. The indicator may also indicate MTC operation at the UE 102.

The MME 106 may transmit, at least partly in response to a determination at the MME 106 of UE 102 inactivity on the EPS bearer 130, a bearer release message to the SGW 108 for release of the S5/S8 bearer 125. The indicator of MTC operation may include a permission indicator from the UE 102 for the release of the S5/S8 bearer as part of the operation of the EPS bearer. This indicator of MTC operation may include an indicator of transmission of small blocks of data or transmission at an infrequent rate. These embodiments are described in more detail below.

In some cases, the UE 102 may be configured to operate as an MTC device, or may be an MTC device. Accordingly, the UE 102 may send small amounts of data at infrequent rates and may be in a sleep mode or power saving mode for long periods of time. As an example, a health sensor or a smart meter may only need to communicate with the network 100 occasionally to send a measurement or a reading. As another example, some MTC devices may operate according to Machine-to-Machine (M2M) or Internet of Things (IoT) techniques or protocols. As another example, various other applications that involve infrequent exchanging of small data may be part of MTC operation. For instance, background traffic from a smart phone may be exchanged as part of MTC operation. For the network 100 to support a large number of such MTC devices, dedicated resources for those devices may be lead to inefficient use of overall available resources, especially when the network 100 may also support other devices like smart-phones that may require or benefit from much higher data rates.

Referring back to FIG. 1, a flow diagram demonstrates an example of network 100 operation when a user inactivity timer at the eNB 104 expires, which may occur in response to inactivity at the UE 102. In this case, the UE 102 may enter an RRC idle mode as a result, and the radio bearer 115 (RRC connection) and S1 bearer 120 may be released. However, the S5/S8 bearer 125 may be retained, and may enable or support "always on" operation for the UE 102. For instance, downlink data intended for the UE 102 that arrives at the PGW 110 may be sent using an IP address maintained as part of a context for the S5/S8 bearer 125. A Non-Access Stratum (NAS) service request in the uplink or downlink may enable a re-establishment of the radio bearer 115 and S1 bearer 120, which may include a mapping between the S1 bearer 120 and the S5/S8 bearer 125 using retained context information. The example operation shown in FIG. 1 may be beneficial for devices like smart-phones, which may use applications that need or prefer high data rates and low latency connectivity.

As previously described, when the network 100 supports a large number of MTC devices that typically do not exchange significant amounts of data, maintenance of the S5/S8 bearer 125 (as in the example in FIG. 1 or other scenarios) may be wasteful or at least inefficient. As an example, an IP address and other information may need to be stored for each MTC device. As another example, related state machines may become intractable or very complicated when a large number of MTC devices are involved. Accordingly, techniques that address these and other issues may improve performance and operation of the network 100.

Figure 5:
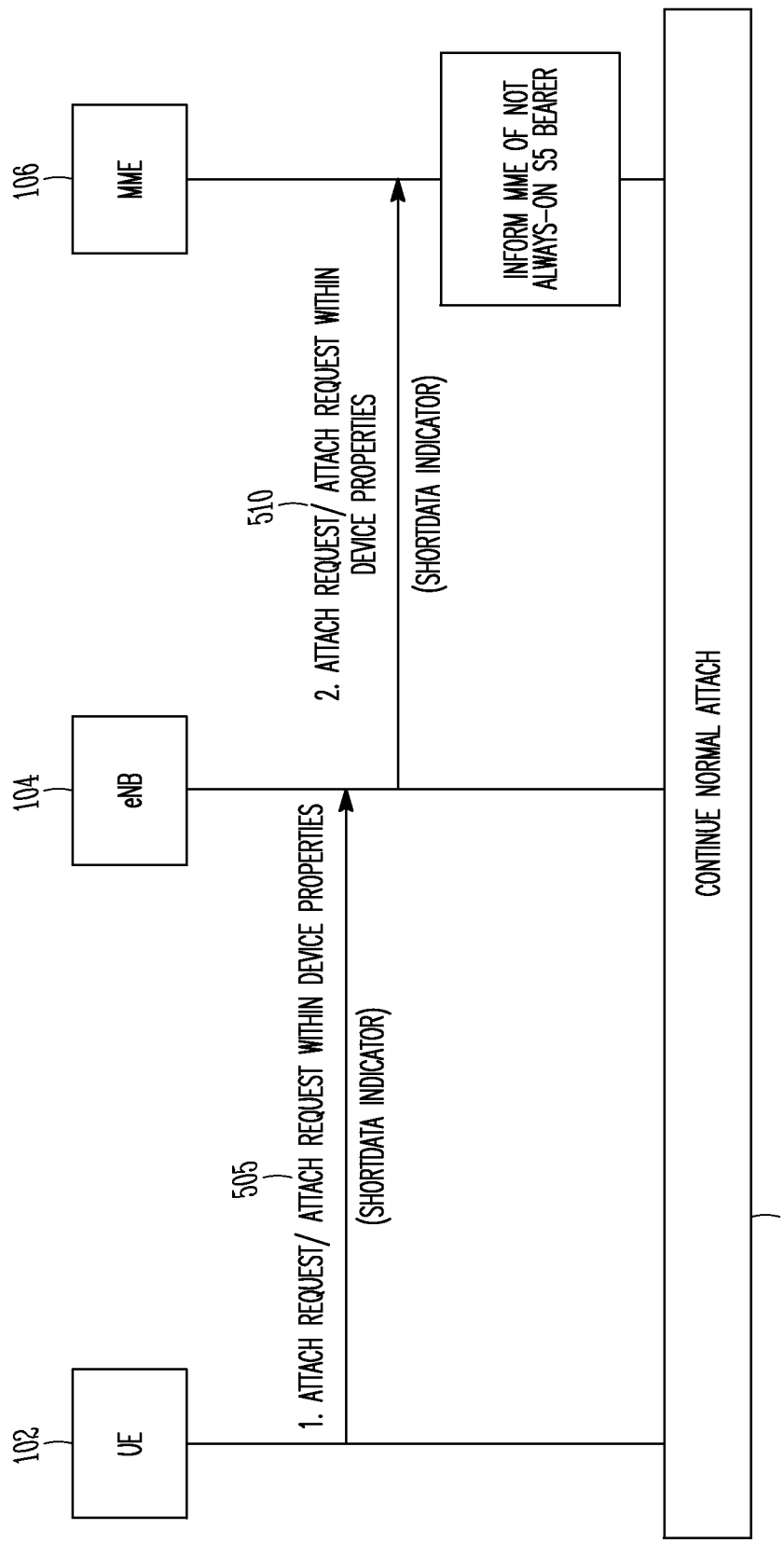
FIG. 5 illustrates an example of an attach request message in accordance with some embodiments.

FIG. 5 illustrates an example of an attach request message in accordance with some embodiments. It should be noted that some embodiments may include some or all of the operations shown in FIGS. 1-13, and some embodiments may include one or more operations from one or more of FIGS. 1-13. Embodiments are not limited in terms of which operations may be included, the number of operations included or in terms of chronological order of operations as presented within FIGS. 1-13 or within the disclosure. Additional operations not shown in FIGS. 1-13 may also be included in some embodiments. Although reference may be made to FIGS. 1-13 in descriptions, it is understood that embodiments may be practiced with or by any other suitable systems, devices, interfaces and components. For example, while FIGS. 1-13 and discussions may refer to eNBs 104 and UEs 102 operating in accordance with 3GPP or other standards, embodiments of those methods are not limited to just those eNBs 104 or UEs 102 and may also be practiced on other mobile devices, such as a Wi-Fi access point (AP) or user station (STA) or by systems or devices configured to operate according to various IEEE standards such as IEEE 802.11

In some embodiments, the MME 106 may support an EPS bearer 130 between the UE 102 and a PGW 110, and the EPS bearer may include an S5/S8 bearer 125 between an SGW 108 and the PGW 110, a radio bearer 115 between the UE 102 and an eNB 104, and an S1 bearer 120 between the SGW 108 and the eNB 104. At operation 505, a transmission of an attach request message from the UE 102 to the eNB 104 may be performed, and a transmission (or forwarding) of the attach request message from the eNB 104 to the MME 106 may be performed at operation 510. Accordingly, a combination of operations 505 and 510 may include a transmission of the attach request message from the UE 102 to the MME 106. In some embodiments, the attach request message may be an "Attach Request/Attach Request within Device Properties" message that may be included in 3GPP or other standards, but the attach request message is not so limited.

The attach request message may include an indicator of Machine Type Communication (MTC) operation at the UE 102. Accordingly, the indicator of MTC operation may be transmitted as part of a UE attachment procedure for the EPS bearer 130, which may also be referred to as an "Enhanced UE Attach Procedure" or similar. In addition, the indicator of MTC operation may be transmitted by the UE 102 for reception at the MME 106 (albeit through a path that may include the eNB 104). As such, the MME 106 may receive, as part of an establishment of the EPS bearer 130 between the UE 102 and the PGW 110, the indicator of MTC operation at the UE 102.

The indicator of MTC operation may enable a release of the S5/S8 bearer 125 in response to a release of the radio bearer 115 or the S1 bearer 120. The indicator of MTC operation may also include a permission indicator for releasing the S5/S8 bearer 125 as part of the operation of the EPS bearer 130. The indicator of MTC operation may also inform the MME 106 that the S5/S8 bearer 125 does not need to configured as an "always-on" bearer that may offer constant, or nearly constant, connectivity. Such a bearer may also be referred to as a "Not Always On" bearer or similar, as shown in FIG. 5.

In some embodiments, the indicator of MTC operation may include an indicator of transmission of small blocks of data at the UE 102 or transmission at an infrequent rate at the UE 102. As shown in FIG. 5, the indicator of MTC operation may be or may include a "ShortData INDICATOR" as may be used in 3GPP or other standards. The indicator may also refer to the frequency of data transmission, such as an "Infrequent Data" or other similar indicator. The indicator may also be an explicit indicator that informs or instructs bearer release in response to inactivity or other events, such as a "Release S5 after Inactivity" message or similar. As an example, a small block of data may include 1000 bytes of data or fewer and the infrequent rate of transmission may be less than once per minute. This example is not limiting, however, as a small block of data may be a block that includes less than 50 bytes, 100 bytes, 200 bytes, 500 bytes or any suitably defined number of bytes. In addition, the infrequent rate is not limited to less than once per minute, and may be less than once per second, 5 seconds, 10 seconds, minute, 5 minutes, 2 hours, 1 day or any suitably defined frequency.

Figure 6:
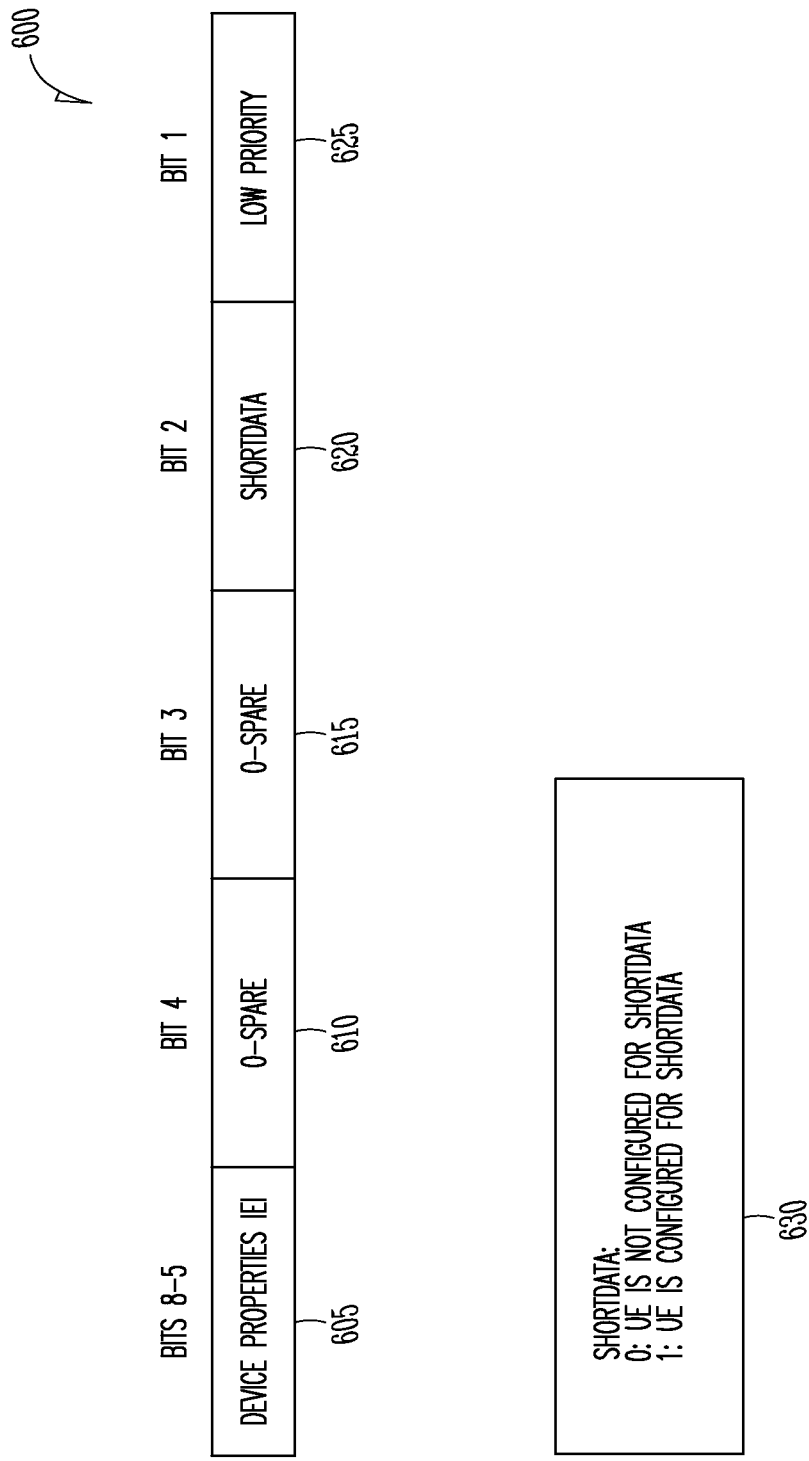
FIG. 6 illustrates an example of an information element (IE) that includes an indicator of MTC operation in accordance with some embodiments.

FIG. 6 illustrates an example of an information element (IE) that includes an indicator of MTC operation in accordance with some embodiments. In FIG. 6, an example of a "ShortData INDICATOR" is shown, which may also be the same or similar to the indicator of MTC operation previously described. The indicator may be included in an update type of information element (IE) (or an additional update type of IE) of the attach request message from the UE 102 to the MME 106. The indicator may inform the MME 106 that the S5 bearer 125 may not always be on, or is not required to always be on, as the UE 102 deals with infrequent short data or due to MTC operation at the UE 102. The "Device Properties" IE 600 may include device properties 605, spare bits 610, 615, and a "low priority" indicator 625. The Device Properties IE 600 may also include a ShortData indicator 620, which may be a binary parameter that indicates whether or not the UE 102 deals with infrequent short data as shown in the example definition 630. The Device Properties IE 600 is not limited to the format shown, which serves as an example of inclusion of the indicator in an IE. In addition to "ShortData," the indicator may also refer to traffic characteristics of the UE 102 to indicate to the network 100 that establishment of "always-on" S5/S8 bearers for the UE 102 may be non-optimum.

The eNB 104 may forward the attach request message to the MME 106 in a Non-Access Stratum (NAS) container. In addition, the UE 102 may communicate the indicator through NAS signaling to the MME 106 or to the eNB 104 through RRC signaling.

Figure 7:
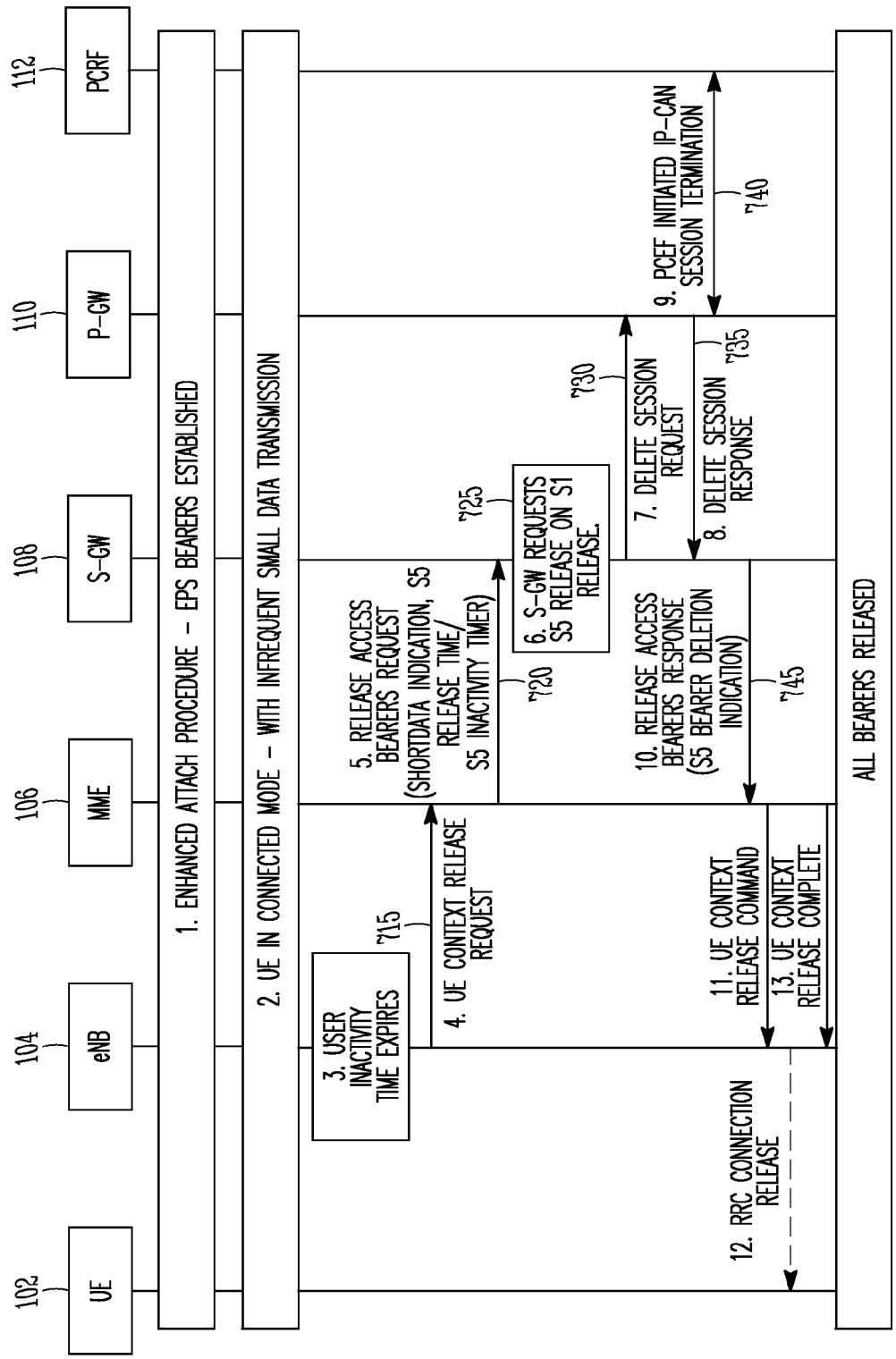
FIG. 7 illustrates an example of a bearer release in accordance with some embodiments.

FIG. 7 illustrates an example of a bearer release in accordance with some embodiments. The MME 106 may transmit a bearer release message to the SGW 108 for release of the S5/S8 bearer 125 included in the EPS bearer 130. The transmission may be performed at least partly in response to a determination, at the MME 106, of UE inactivity on the EPS bearer 130. At operation 715, a "UE Context Release Request" or similar message may be transmitted from the eNB 104 to the MME 106. The transmission may be performed in response to an expiration of a user inactivity timer at the eNB 104 (as shown in the box labeled "3" in FIG. 7). Accordingly, in some embodiments, the determination of UE inactivity at the MME 106 may be based at least partly on a reception of an indicator, from the eNB 104, of an expiration of an inactivity timer for the UE 102. Such an indicator may be included in the message received from the eNB 104 at operation 715.

At operation 720, the MME 106 may transmit a "Release Access Bearers Request" or similar message to the SGW 108, which may be a bearer release message for release of the S5/S8 bearer 125. Accordingly, the MME 106 may transmit such a bearer release message at least partly in response to the determination of UE inactivity and when it has been established that the S5/S8 bearer 125 should or can be released for the EPS bearer 130 in such conditions, as discussed previously. In some embodiments, the MME 106 may determine, based at least partly on core network (CN) assistance information for the UE, if the S5/S8 is releasable, and the decision on whether to transmit the bearer release message may be based at least partly on that determination.

The CN assistance information may include traffic pattern information, subscription information for the UE 102, PSM configuration information for the UE 102 or other similar or related information. Such CN information may be conveyed to the MME 106, eNB 104 or other node in the network, which may use the CN information to determine if the UE 102 may be allowed to release the S5/S8 bearer 125 (or if it is "releasable"). The CN information may reflect which UEs 102 have periods of longer inactivity, and therefore may be used to determine or flag with UEs 102 may be able to release the S5/S8 bearer 125.

At operation 730, the SGW 108 may transmit a "Delete Session Request" or similar message to the PGW 110. The message may request the release of the S5/S8 bearer 125 and may also (implicitly or explicitly) request deletion of context information for the UE 102 at the PGW 110. The context information may be re-established at the PGW 110 or SGW 108 using an Attach procedure when required or requested.

The PGW 110 may send a "Delete Session Response" message to the SGW 108 in response to reception of the Delete Session Request message. In response to, or upon deletion of the S5/S8 bearer 125, the SGW 108 may acknowledge the deletion by sending an "Enhanced Release Access Bearers Response" message to the MME 106. In addition, various other operations as shown in FIG. 7 may be performed in some embodiments.

Figure 8:
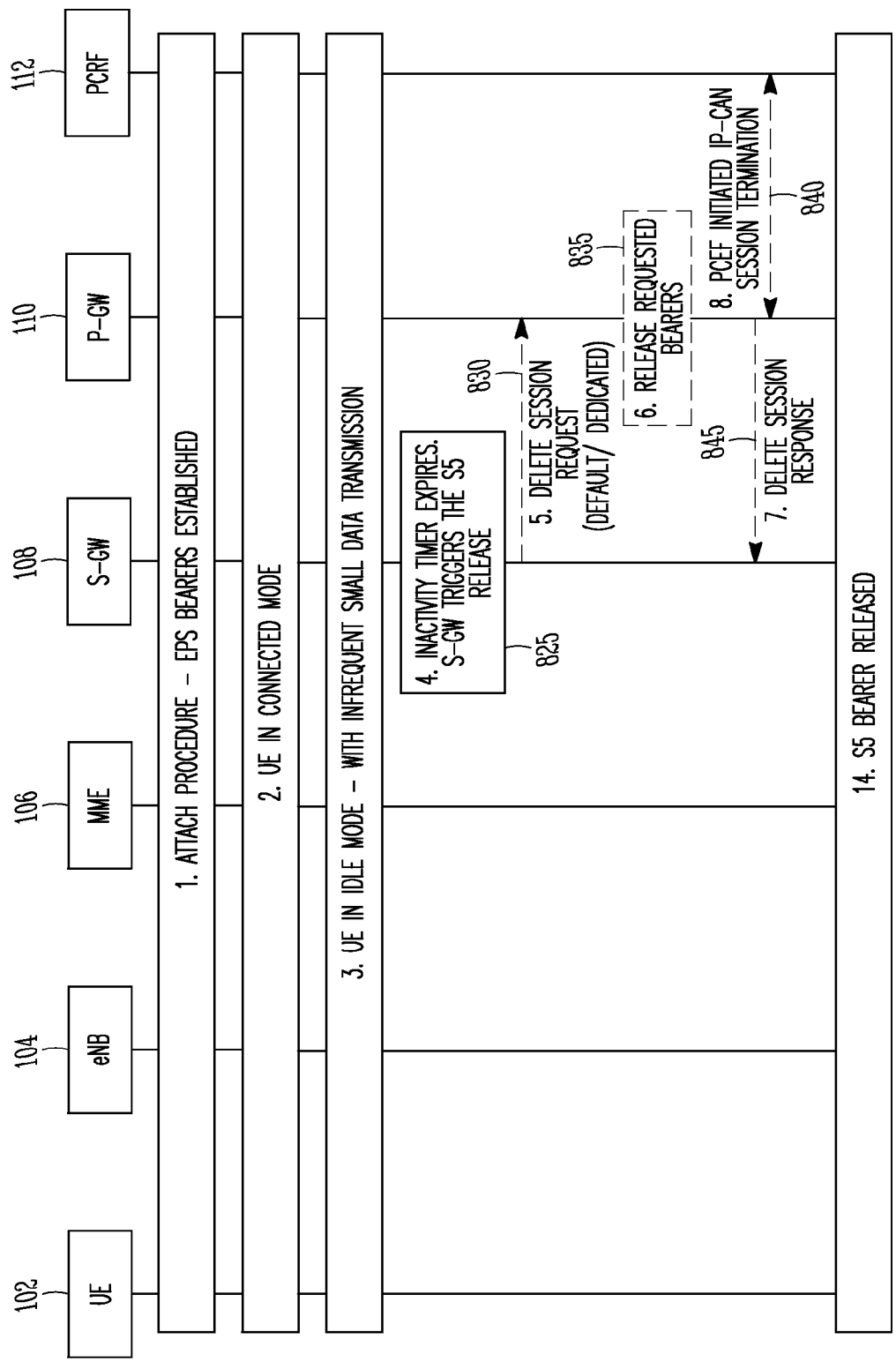
FIG. 8 illustrates another example of a bearer release in accordance with some embodiments.

FIG. 8 illustrates another example of a bearer release in accordance with some embodiments. The SGW 108 may support PS services in accordance with Evolved Packet System (EPS) bearers, and may exchange packets with the PGW 110 on an S5/S8 bearer 125 included in an EPS bearer 130 between the PGW 110 and a UE 102. The SGW 108 may receive an indicator of MTC operation at the UE 102 on the EPS bearer 130, and may therefore know that the S5/S8 bearer 125 is releasable in scenarios or conditions like those previously described. The indicator may be included in any suitable message or in accordance with previous techniques. The SGW 108 may transmit a bearer release request for the S5/S8 bearer 125 at least partly in response to a determination, at the SGW 108, of UE inactivity on the EPS bearer 130. The bearer release request may be similar to or related to a "Delete Session Request" or similar message transmitted at operation 830 in FIG. 8 but is not limited as such.

In some embodiments, the determination, at the SGW 108, of UE inactivity on the EPS bearer 130 may include a reception, from the MME 106, of a bearer release message (such as in operation 720). As previously described, the SGW 108 may exchange packets on an S1 bearer 120 with an eNB 104 that also may exchange packets on a radio bearer 115 with the UE 102. The bearer release message received from the MME 106 may indicate a release of the S1 bearer 120 or radio bearer 115 (or both), in some embodiments.

In some embodiments, the SGW 108 may trigger the S5/S8 release. At operation 825 in FIG. 8, the SGW 108 may determine UE inactivity based at least partly on an expiration of an inactivity timer for the EPS bearer 130 at the SGW 108, and may transmit the bearer release request (such as in operation 830) in response to that determination. In some embodiments, the SGW 108 may monitor for activity related to exchanging of packets on the EPS bearer 130 according to the inactivity timer and may reset the inactivity timer in response to a detection of activity on the EPS bearer 130. The UE inactivity on the EPS bearer may be determined when a duration of time greater than an inactivity expiration parameter has elapsed since all previous resets of the inactivity timer. That is, after a time duration greater than or equal to the inactivity expiration parameter has passed without activity on the EPS bearer 130, UE inactivity is declared at the SGW 108. The inactivity expiration parameter may be part of 3GPP or other standards, and may be communicated between components during setup or other operations. Returning to FIG. 8, at operation 835, the PGW 110 may release the S5/S8 bearer 125 and/or other bearers, and may delete context information as part of that operation. In addition, various other operations as shown in FIG. 8 may be performed in some embodiments.

Figures 9, 10:
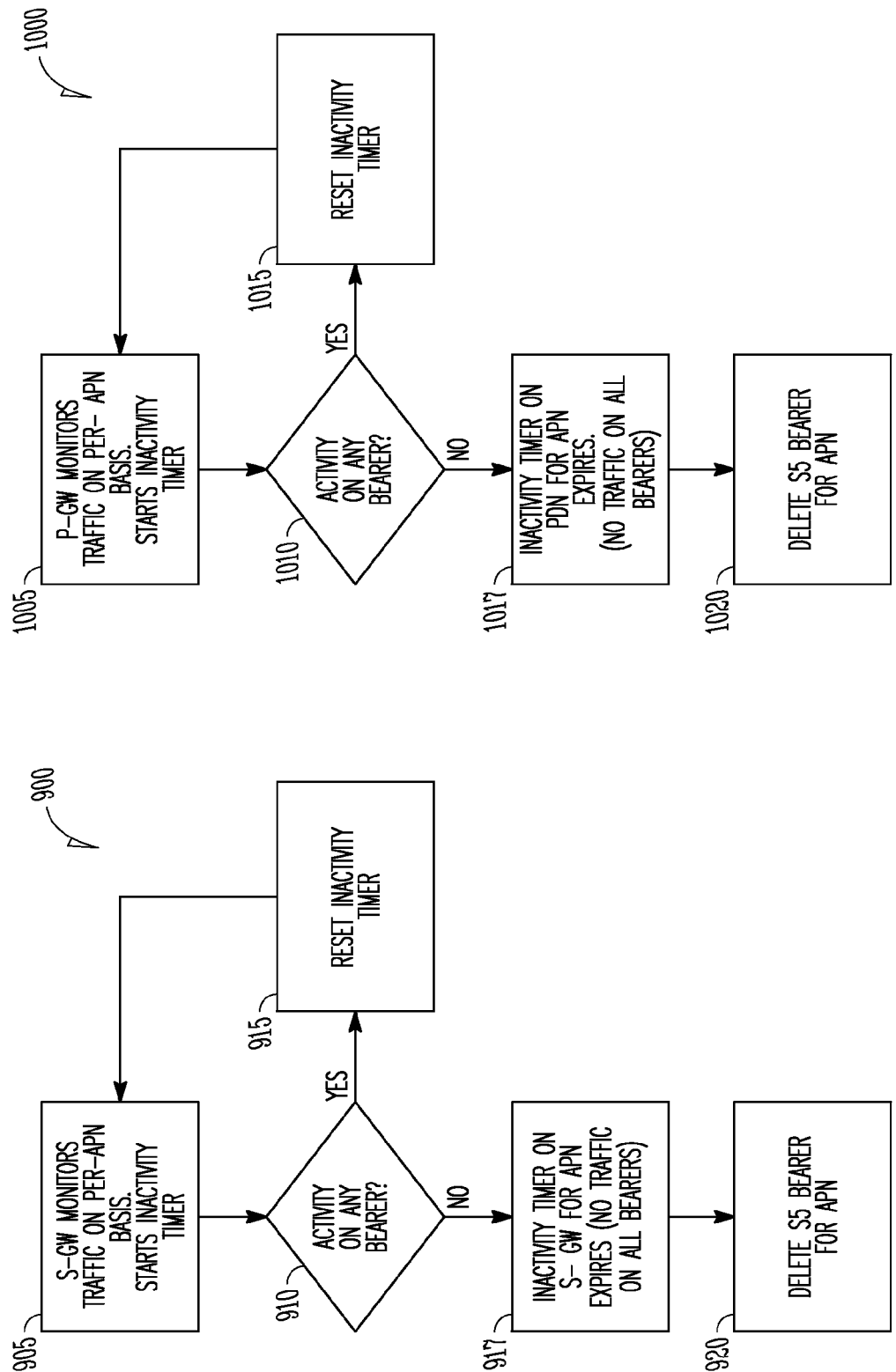
FIG. 9 illustrates an example of operation of an inactivity timer in accordance with some embodiments.
FIG. 10 illustrates another example of operation of an inactivity timer in accordance with some embodiments.

FIG. 9 illustrates an example of operation of an inactivity timer in accordance with some embodiments. In the example monitoring method 900 shown in FIG. 9, the SGW 108 may monitor traffic on a per-APN basis and may start the inactivity timer at operation 905. If activity is detected on any bearer of the EPS bearer 130 at operation 910, the inactivity timer may be reset at operation 915 and the method 900 may return to operation 905. However, if no activity is detected at operation 910, the inactivity timer may expire at operation 917 and the S5/S8 bearer 125 may be deleted at operation 920.

FIG. 10 illustrates another example of operation of an inactivity timer in accordance with some embodiments. The example monitoring method 1000 shown in FIG. 10 may be performed at the PGW 110 (as opposed to the SGW 108). It should be noted that operations and control logic for the method 1000 may be similar or the same as operations and control logic for the method 900. The methods 900 and 1000 are limited as such, although some or all of the previous discussion related to the inactivity timer for the SGW 108 may apply to the method 1000. It should be noted that inactivity timers maintained by the SGW 108 or PGW 110 may be maintained on a per APN basis, which may include maintenance of the timer for all PDN connections belonging to the same APN. In addition, the SGW 108 may send a Delete Session Request message per PDN in order to release all the bearers associated with the PDN connection or may send the message for a specific bearer which is inactive.

FIG. 11 illustrates another example of a bearer release in accordance with some embodiments. The PGW 110 may support PS services in accordance with Evolved Packet System (EPS) bearers, and may exchange packets with the SGW 108 on an S5/S8 bearer 125 included in an EPS bearer 130 between the PGW 110 and a UE 102. The PGW 110 may receive an indicator of MTC operation at the UE 102 on the EPS bearer 130, and may therefore know that the S5/S8 bearer 125 is releasable in scenarios or conditions like those previously described. The PGW 110 may transmit a bearer release request for the S5/S8 bearer 125 at least partly in response to a determination, at the PGW 110, of UE inactivity on the EPS bearer 130. Accordingly, the PGW 110 may trigger the S5/S8 release. The bearer release request may be similar to or related to a "Delete Bearer Request" or similar message transmitted at operation 1110 in FIG. 11 but is not limited as such. The determination of UE inactivity may be based at least partly on an expiration of an inactivity timer for the EPS bearer 130 at the PGW 110, as in operation 1105 or in method 1000, but is not limited as such. Previous techniques described for use of an inactivity timer at the SGW 108 may also be used. In addition, various other operations as shown in FIG. 11 may be performed in some embodiments. In addition, the PGW 110 may send the Delete Bearer Request message per PDN in order to release all the bearers associated with the PDN connection or may send the message for a specific bearer which is inactive.

Figure 12:
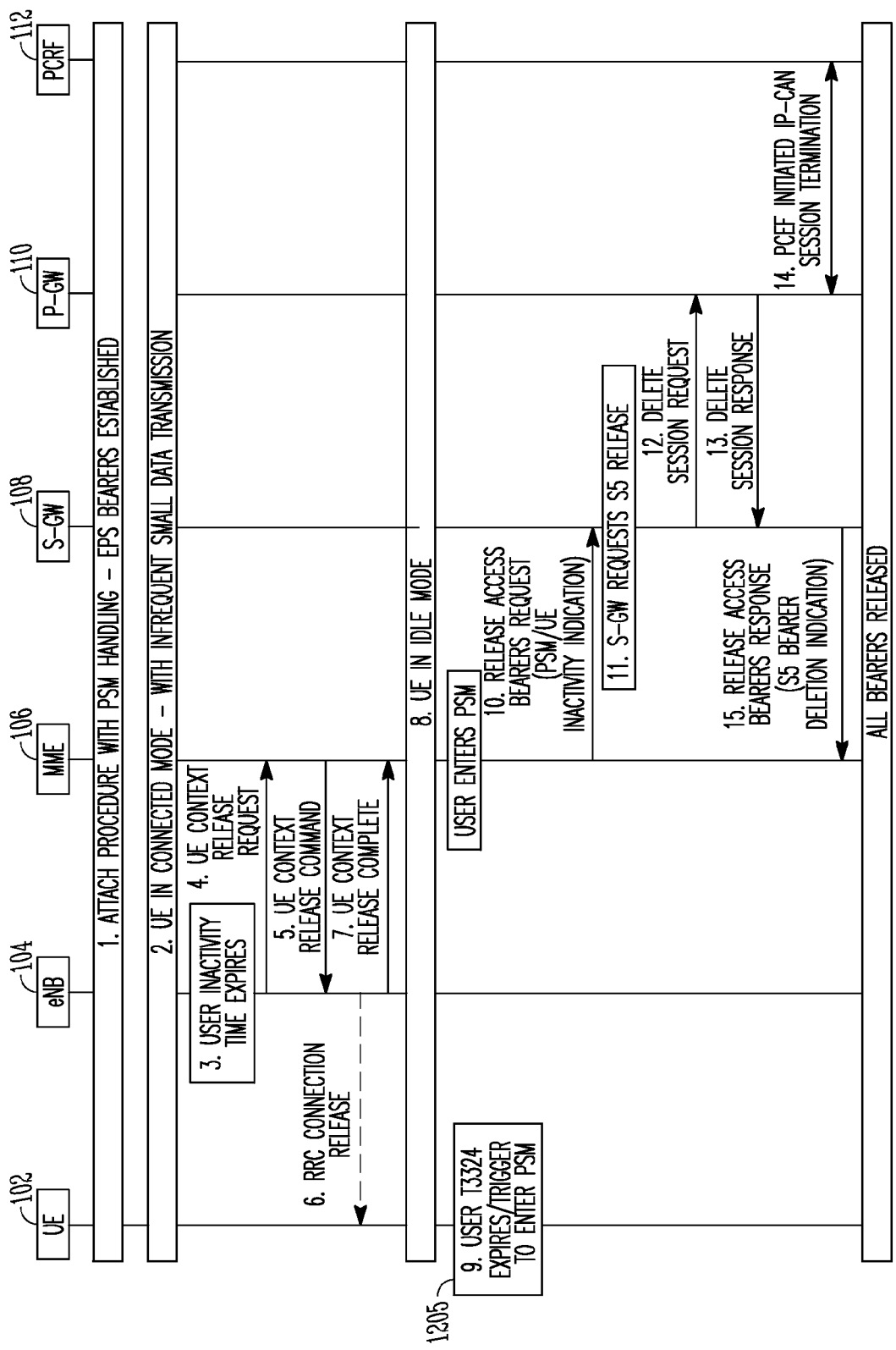
FIG. 12 illustrates another example of a bearer release in accordance with some embodiments.

FIG. 12 illustrates another example of a bearer release in accordance with some embodiments. After it enters the RRC idle mode described earlier, the UE 102 may enter or be entered into a power saving mode (PSM) in which power at the UE 102 may be saved during long periods of inactivity at the UE 102.

The UE 102 may enter the PSM at operation 1205. In some embodiments, operation in the PSM may include refraining from reception of messages during a PSM time period. While in PSM, the UE 102 may refrain from monitoring for signals, including paging, data or other signals and may refrain from performing measurements for tasks such as cell selection or reselection or similar. The PSM operation may last for periods of time which may be substantial in some cases. The PSM state may be invoked by the UE 102 through sending an active time period timer, or T3324 value, within an Attach/Tracking Area Update (TAU) request message to the MME 106. If the MME 106 accepts that the UE 102 may enter the PSM state, the MME 106 may respond with the same or different timer value in a corresponding accept message. The MME 106 may indicate the PSM by providing an indication within the "Release Access Bearer Request" message in S11 to the SGW 108. The indication of PSM may reflect the recent negotiation between the UE 102 and the MME 106 for the UE 102 to enter PSM, and may be mentioned as "PSM indication," "UE Inactivity Notification," "UE Idle PSM Notification," or similar in the message. Such operation may enable the MTC device to preserve its battery or power source. Accordingly, such devices may not need to have the S5/S8 bearer 125 maintained.

Previous discussion regarding the indicator of MTC operation may also apply to an indicator of PSM operation at the UE, or an indicator that the UE 102 is entering or will enter PSM. The indicator of PSM operation at the UE 102 may be transmitted to the MME 106 using previously described techniques (such as transmission to the eNB 104 for forwarding to the MME 106). In some embodiments, the indicator of PSM operation may be at least partly based on an expiration of a PSM timer that reflects UE 102 operation in the PSM mode. Accordingly, the UE 102 may enter PSM, and the MME 106 may know this information as the MME 106 may maintain the PSM timer. When the PSM timer expires, the MME 106 may send an indicator of such to the SGW 108. The SGW 108 may delete or release S5/S8 and/or other bearers in response.

In some embodiments, the indicator of PSM operation may play a similar role as the indicator of MTC operation in previous discussion and techniques. As an example, releasing of the S5/S8 bearer 125 may be performed in response to a determination that the UE 102 is in PSM.

Figure 13:
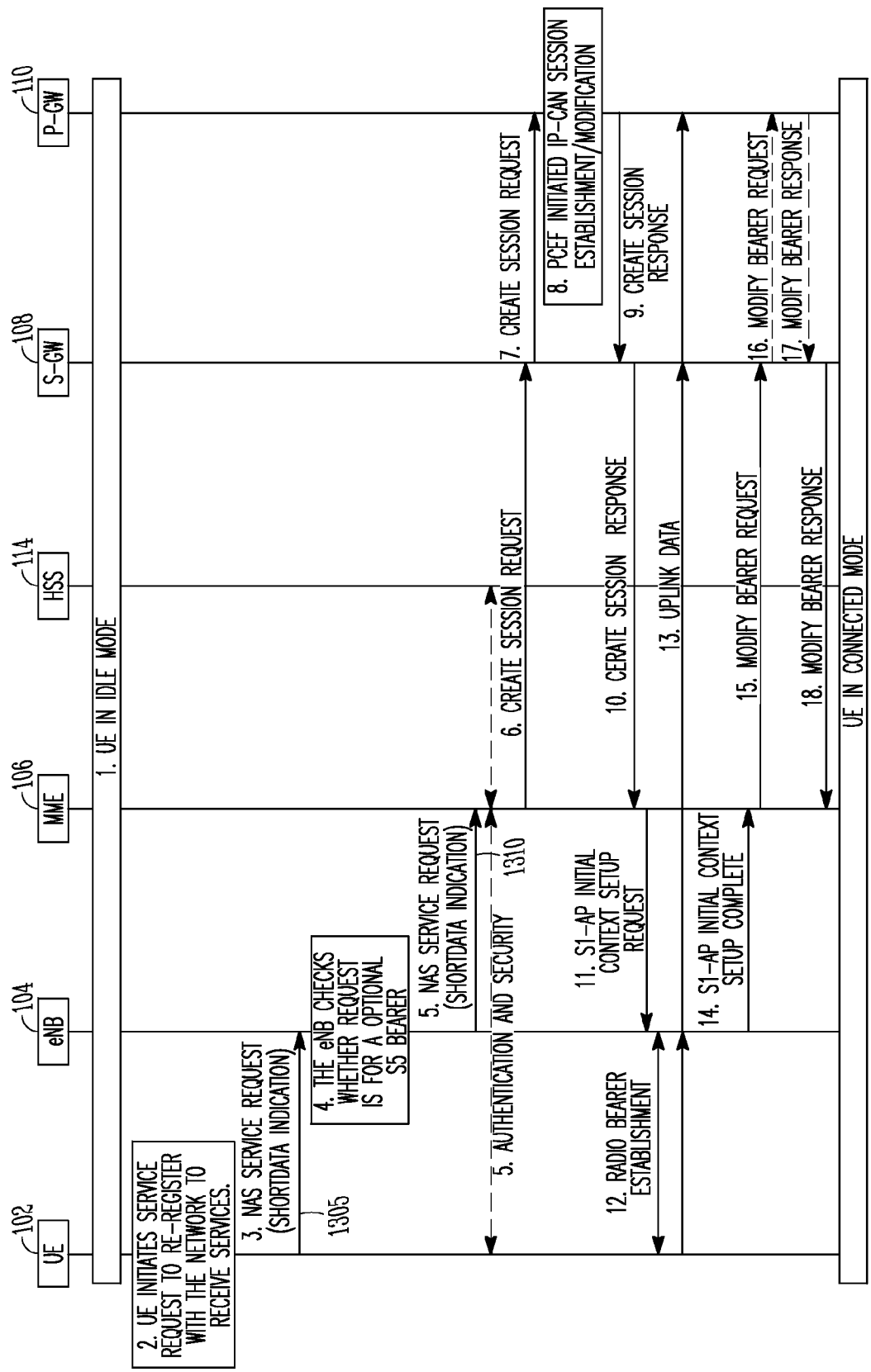
FIG. 13 illustrates an example of bearer re-establishment in accordance with some embodiments.

FIG. 13 illustrates an example of bearer re-establishment in accordance with some embodiments. When the S5/S8 bearer 125 is released (and the UE 102 is in an idle mode), the UE 102 may have uplink data for transmission at some point in the future. The uplink data may be "Mobile-Originated" (MO) data, but is not limited as such. The UE 102 may transmit an indicator of MTC operation as part of a re-establishment process in response to a release of the S5/S8 bearer 125 and a determination that uplink data is to be transmitted on the EPS bearer 130. If the S5/S8 bearer 125 has been previously deleted, it may have to be re-established in some cases. At operation 1305, a message that includes an indicator of MTC operation at the UE 102 may be transmitted to the eNB 104, using similar techniques as previously described for attach procedures. The message can be a NAS service request message, which may be enhanced to indicate whether the application deals with infrequent data. If the application deals with infrequent data, a MO-IFData bearer (which may be included in 3GPP or other standards) may be established. Otherwise, normal service request procedures may be performed.

At operation 1310, the indicator may be transmitted or forwarded to the MME 106, using similar techniques as previously described for attach procedures. The MME 106, in response to reception of the MO-IFData bearer request, may send a "Create Session Request" message to the SGW 108, which may forward the message to the PGW 110. After establishment of the radio bearer 115, a "Modify Bearer Request" message may be sent from the MME 106 to the SGW 108 in order to facilitate the re-establishment of the S5/S8 bearer 125. The process may re-establish the radio bearer 115, S1 bearer 120, and the S5/S8 bearer 125 and may bring the UE 102 into RRC connected mode. In addition, various other operations as shown in FIG. 13 may be performed in some embodiments.

The MME 106 may receive, from the PGW 110, an Internet Protocol (IP) address for exchanging of packets by the UE 102. The MME 106 may also transmit the IP address to the UE 102. The IP address may be a new IP address. The IP address may be transmitted to the UE 102 in a Non-Access Stratum (NAS) message, although any suitable message may be used. For example, the message may be a "Service Request Accept" or an "IP Address Indication" message or other message. These messages may be included in 3GPP or other standards but are not so limited.

For network initiated downlink operation, when the S5/S8 bearer 125 has been deleted, a triggering mechanism may be used in order to page the UE 102 and re-establish registration with the network to receive services. When the SCS/AS sends a downlink packet to the network, the PGW 110 may fail to route the packet as the context of the S5/S8 bearer 125 may no longer be present. The PGW 110 may inform the SCS/AS of the failure and may ask the SCS to trigger the UE 102. The SCS/AS may initiate a triggering procedure and may page the UE 102, informing the UE 102 to initiate a Service Request procedure in order to register with the network.

It should be noted that the network 100 and its components, such as the eNB 104, MME 106, SGW 108, and PGW 110 may also support non-MTC UEs, in some cases while simultaneously supporting one or more MTC UEs. Accordingly, techniques and operations applied to the non-MTC UEs may be different than some or all of those used for MTC UEs described herein.

As an example, a first EPS bearer for a first UE configured for MTC operation may include a first radio bearer between the first UE and an eNB, a first S1 bearer between the eNB and an SGW, and a first S5/S8 bearer between the SGW and a PGW. A second EPS bearer may be simultaneously supported by the network 100 for a second UE configured for non-MTC operation. The second EPS bearer may include a second radio bearer between the second UE and the same eNB, a second S1 bearer between the eNB and the same SGW, and a second S5/S8 bearer between the SGW and the same PGW. Both EPS bearers may be managed by the same MME. In some cases, the MME may refrain from transmission of bearer release messages for the second S5/S8 bearer in response to a reception of a notification of a release of the second radio bearer or the second S1 bearer or a determination of UE inactivity on the second EPS bearer. In contrast, S5/S8 bearers for MTC devices such as the first UE may be released in similar situations in some embodiments described herein.

As another example, the SGW 108 may support a first MTC UE that exchanges packets over a first EPS bearer 130 with the PGW 110 and may also support a second non-MTC UE that exchanges packets over a second EPS bearer 130 with the same PGW 110. The SGW 108 may transmit a bearer release request for the first UE 102 in response to a determination of UE inactivity on the first EPS bearer, but may also refrain from transmission of bearer release requests for a second S5/S8 bearer included in the second EPS bearer even when UE inactivity on the second EPS bearer is determined.

A Mobility Management Entity (MME) to support packet-switched (PS) services in a network in accordance with Evolved Packet System (EPS) bearers is disclosed herein. The MME may include hardware processing circuitry configured to receive, as part of an establishment of an EPS bearer between a User Equipment (UE) and a Packet Data Network Gateway (PGW), an indicator of Machine Type Communication (MTC) operation at the UE. The hardware processing circuitry may be further configured to, at least partly in response to a determination, at the MME, of UE inactivity on the EPS bearer, transmit a bearer release message to a Serving Gateway (SGW) for release of an S5/S8 bearer between the SGW and the PGW that is included in the EPS bearer. In some embodiments, the indicator of MTC operation may include a permission indicator from the UE for the release of the S5/S8 bearer as part of the operation of the EPS bearer. In some embodiments, the indicator of MTC operation may include an indicator of transmission of small blocks of data or transmission at an infrequent rate. In some embodiments, a small block of data may include 1000 bytes of data or fewer and the infrequent rate may be less than once per minute.

In some embodiments, the determination of UE inactivity may be based at least partly on a reception of an indicator, from an Evolved Node-B (eNB), of an expiration of an inactivity timer for the UE, and a radio bearer included in the EPS bearer may enable exchanging of packets between the UE and the eNB. In some embodiments, the determination of UE inactivity may be based at least partly on a reception of an indicator of power saving mode (PSM) operation at the UE, and operation in the PSM may include refraining from reception of messages during a PSM time period. In some embodiments, the indicator of PSM operation may include a PSM timer parameter that reflects a future time for UE operation in the PSM mode and the determination of UE inactivity may be further based at least partly on an expiration of a timer at the MME that operates according to the PSM timer parameter.

The hardware processing circuitry may be further configured to determine, based at least partly on core network (CN) assistance information for the UE, if the S5/S8 is releasable. In some embodiments, the transmission of the bearer release message for release of the S5/S8 bearer may be further performed at least partly in response to the determination that the S5/S8 bearer is releasable. A second EPS bearer for a second UE configured for non-MTC operation may include a second radio bearer between the second UE and an Evolved Node-B (eNB), a second S1 bearer between the eNB and the SGW, and a second S5/S8 bearer between the SGW and the PGW. The hardware processing circuitry may be further configured to, in response to a reception of a notification of a release of the second radio bearer or the second S1 bearer, refrain from transmission of bearer release messages for the second S5/S8 bearer.

The hardware processing circuitry may be further configured to receive, from the PGW, an Internet Protocol (IP) address for exchanging of packets by the UE and to transmit the IP address to the UE. In some embodiments, the IP address may be transmitted to the UE in a Non-Access Stratum (NAS) message.

A non-transitory computer-readable storage medium that stores instructions for execution by one or more processors to perform operations to support packet-switched (PS) services in a network in accordance with Evolved Packet System (EPS) bearers is also disclosed herein. The operations may configure the one or more processors to receive, as part of an establishment of an EPS bearer between a User Equipment (UE) and a Packet Data Network Gateway (PGW), an indicator of Machine Type Communication (MTC) operation at the UE. The operations may further configure the one or more processors to, at least partly in response to a determination, at the MME, of UE inactivity on the EPS bearer, transmit a bearer release message to a Serving Gateway (SGW) for release of an S5/S8 bearer between the SGW and the PGW that is included in the EPS bearer. In some embodiments, the determination of UE inactivity may be based at least partly on a reception of an indicator of power saving mode (PSM) operation at the UE and operation in the PSM may include refraining from reception of messages during a PSM time period. In some embodiments, the determination of UE inactivity may be based at least partly on a reception of an indicator, from an Evolved Node-B (eNB), of an expiration of an inactivity timer for the UE. A radio bearer included in the EPS bearer may enable exchanging of packets between the UE and the eNB.

A method of supporting packet-switched (PS) services in a network in accordance with Evolved Packet System (EPS) bearers is disclosed herein. The method may comprise transmitting a bearer release message for release of an S5/S8 bearer for a first UE operating as a Machine Type Communication (MTC) UE when an inactivity condition is determined for the first UE. The method may further comprise refraining from transmission of bearer release messages for release of S5/S8 bearers for a second UE operating as a non-MTC UE. The S5/S8 bearers may be included in EPS bearers between the UEs and one or more Packet Data Network Gateways (PGWs). The method may further comprise receiving an indicator of MTC operation for the first UE as part of an establishment of the EPS bearer for the first UE. In some embodiments, the determination of the inactivity condition for the first UE may be based at least partly on a reception of an indicator of power saving mode (PSM) operation at the first UE. Operation in the PSM may include refraining from reception of messages during a PSM time period. In some embodiments, the determination of the inactivity condition for the first UE may be based at least partly on a reception of an indicator, from an Evolved Node-B (eNB), of an expiration of an inactivity timer for the first UE.

User Equipment (UE) to support Machine Type Communication (MTC) in accordance with an Evolved Packet System (EPS) bearer is also disclosed herein. The UE may comprise hardware processing circuitry configured to transmit, for reception at a Mobility Management Entity (MME) that supports an EPS bearer between the UE and a Packet Data Network Gateway (PGW), an indicator of Machine Type Communication (MTC) operation that indicates that the UE operates as an MTC UE. The indicator of MTC operation may enable a release of an S5/S8 bearer between a Serving Gateway (SGW) and the PGW. The EPS bearer may include the S5/S8 bearer, a radio bearer between the UE and an Evolved Node-B (eNB), and an S1 bearer between the eNB and the SGW. In some embodiments, the S5/S8 bearer may be released in response to a determination of UE inactivity on the EPS bearer. In some embodiments, the S5/S8 bearer may be released in response to a release of the radio bearer or a release of the S1 bearer. In some embodiments, the indicator of MTC operation may be transmitted as part of a UE attachment procedure for the EPS bearer. In some embodiments, the indicator of MTC operation may include a permission indicator for releasing the S5/S8 bearer as part of the operation of the EPS bearer.

In some embodiments, the indicator of MTC operation may include an indicator of transmission of small blocks of data or transmission at an infrequent rate. In some embodiments, a small block of data may include 1000 bytes of data or fewer and the infrequent rate may be less than once per minute. The hardware processing circuitry may be further configured to transmit an indicator of power saving mode (PSM) operation at the UE. In some embodiments, operation in the PSM (for the UE) may include refraining from reception of messages during a PSM time period. In some embodiments, the indicator of PSM operation may be at least partly based on an expiration of a PSM timer that reflects UE operation in the PSM mode. In some embodiments, the transmission of the indicator of MTC operation may be performed as part of a re-establishment process in response to a release of the S5/S8 bearer and a determination that uplink data is to be transmitted on the EPS bearer.

A Serving Gateway (SGW) to support packet-switched (PS) services in accordance with Evolved Packet System (EPS) bearers is also disclosed herein. The SGW may include hardware processing circuitry configured to exchange packets with a Packet Data Network Gateway (PGW) on an S5/S8 bearer included in an EPS bearer between the PGW and a User Equipment (UE) and receive an indicator of Machine Type Communication (MTC) operation at the UE on the EPS bearer. The hardware processing circuitry may be further configured to transmit a bearer release request for the S5/S8 bearer at least partly in response to a determination, at the SGW, of UE inactivity on the EPS bearer. The hardware processing circuitry may be further configured to refrain from transmission of bearer release requests for a second S5/S8 bearer included in a second EPS bearer between the PGW and a second UE that is configured for non-MTC operation.

The hardware processing circuitry may be further configured to exchange packets with an Evolved Node-B (eNB) on an S1 bearer included in the EPS bearer. In some embodiments, the determination of UE inactivity on the EPS bearer may include a reception, from the MME, of a bearer release message for the S1 bearer or for a radio bearer between the eNB and the UE included in the EPS bearer. In some embodiments, the determination of UE inactivity may be based at least partly on an expiration of an inactivity timer for the EPS bearer at the SGW. The hardware processing circuitry may be further configured to monitor for activity related to exchanging of packets on the EPS bearer according to an inactivity timer and reset the inactivity timer in response to a detection of activity on the EPS bearer. In some embodiments, the UE inactivity on the EPS bearer may be determined when a duration of time greater than an inactivity expiration parameter has elapsed since all previous resets of the inactivity timer.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A Mobility Management Entity (MME) to support packet-switched (PS) services in a network in accordance with Evolved Packet System (EPS) bearers, the MME comprising:
a memory;
interfaces configured to communicate with a Serving Gateway (SGW) and an Evolved Node-B (eNB);
hardware processing circuitry in communication with the memory and via the interfaces configured to:
receive, as part of an establishment of an EPS bearer between a User Equipment (UE) and a Packet Data Network Gateway (PGW), an indicator of Machine Type Communication (MTC) operation that indicates that the UE operates as an MTC UE; and
at least partly in response to a determination, at the MME, of UE inactivity on the EPS bearer, transmit a bearer release message to the SGW for release of an S5/S8 bearer between the SGW and the PGW that is included in the EPS bearer,
wherein a second EPS bearer for a second UE configured for non-MTC operation includes a second radio bearer between the second UE and the eNB, a second S1 bearer between the eNB and the SGW, and a second S5/S8 bearer between the SGW and the PGW, and
the hardware processing circuitry is further configured to, in response to a reception of a notification of a release of the second radio bearer or the second S1 bearer, refrain from transmission of bearer release messages for the second S5/S8 bearer.

2. The MME according to claim 1, wherein the indicator of MTC operation includes a permission indicator from the UE for the release of the S5/S8 bearer as part of the operation of the EPS bearer.

3. The MME according to claim 1, wherein the indicator of MTC operation includes an indicator of transmission of small blocks of data or transmission at an infrequent rate, wherein a small block of data includes 1000 bytes of data or fewer and the infrequent rate is less than once per minute.

4. The MME according to claim 1, wherein the determination of UE inactivity is based at least partly on a reception of an indicator, from an Evolved Node-B (eNB), of an expiration of an inactivity timer for the UE, wherein a radio bearer included in the EPS bearer enables exchanging of packets between the UE and the eNB.

5. The MME according to claim 1, the hardware processing circuitry further configured to:
receive, from the PGW, an Internet Protocol (IP) address for exchanging of packets by the UE; and
transmit the IP address to the UE.

6. The MME according to claim 5, wherein the IP address is transmitted to the UE in a Non-Access Stratum (NAS) message.

7. The MME according to claim 1, wherein the determination of UE inactivity is based at least partly on a reception of an indicator of power saving mode (PSM) operation at the UE, wherein operation in the PSM includes refraining from reception of messages during a PSM time period.

8. The MME according to claim 7, wherein the indicator of PSM operation is based at least partly on an expiration of a PSM timer that reflects UE operation in the PSM mode and the determination of UE inactivity is further based at least partly on an expiration of a timer at the MME that operates according to a PSM timer parameter.

9. The MME according to claim 1, wherein:
the hardware processing circuitry is further configured to determine, based at least partly on core network (CN) assistance information for the UE, if the S5/S8 is releasable; and
the transmission of the bearer release message for release of the S5/S8 bearer is further performed at least partly in response to the determination that the S5/S8 bearer is releasable.

10. The MME according to claim 1, wherein:
the indicator is received in a UE Device Properties information element (IE) that comprises a ShortData indicator and a traffic characteristics indicator, the ShortData indicator comprising a binary parameter that indicates whether or not the UE deals with infrequent short data, the traffic characteristics indicator configured to indicate that establishment of always-on S5/S8 bearers for the UE is non-optimum.

11. A non-transitory computer-readable storage medium that stores instructions for execution by one or more processors to perform operations to support packet-switched (PS) services in a network in accordance with Evolved Packet System (EPS) bearers, the operations to configure the one or more processors to:
receive, as part of an establishment of an EPS bearer between a User Equipment (UE) and a Packet Data Network Gateway (PGW), an indicator of Machine Type Communication (MTC) operation that indicates that the UE operates as an MTC UE;
at least partly in response to a determination of UE inactivity on the EPS bearer, transmit a bearer release message to a Serving Gateway (SGW) for release of an S5/S8 bearer between the SGW and the PGW that is included in the EPS bearer,
wherein a second EPS bearer for a second UE configured for non-MTC operation includes a second radio bearer between the second UE and the eNB a second S1 bearer between the eNB and the SGW, and a second S5/S8 bearer between the SGW and the PGW, and
in response to a reception of a notification of a release of the second radio bearer or the second S1 bearer, refrain from transmission of bearer release messages for the second S5/S8 bearer.

12. The non-transitory computer-readable storage medium according to claim 11, wherein the determination of UE inactivity is based at least partly on a reception of an indicator of power saving mode (PSM) operation at the UE, wherein operation in the PSM includes refraining from reception of messages during a PSM time period.

13. The non-transitory computer-readable storage medium according to claim 11, wherein the determination of UE inactivity is based at least partly on a reception of an indicator, from an Evolved Node-B (eNB), of an expiration of an inactivity timer for the UE, wherein a radio bearer included in the EPS bearer enables exchanging of packets between the UE and the eNB.

14. A method of supporting packet-switched (PS) services in a network in accordance with Evolved Packet System (EPS) bearers, the method comprising:
transmitting a bearer release message for release of an S5/S8 bearer for a first User Equipment (UE) operating as a Machine Type Communication (MTC) UE when an inactivity condition is determined for the first UE;
refraining from transmission of bearer release messages for release of S5/S8 bearers for a second UE operating as a non-MTC UE in response to a reception of a notification of a release of a second radio bearer between the second UE and an Evolved Node-B (eNB) or a second S1 bearer between the eNB and a Serving Gateway (SGW), wherein the S5/S8 bearers are included in EPS bearers between the UEs and one or more Packet Data Network Gateways (PGWs), the EPS bearers further comprising the second radio bearer the second S1 bearer, and the S5/S8 bearers.

15. The method according to claim 14, further comprising receiving an indicator of MTC operation for the first UE as part of an establishment of the EPS bearer for the first UE.

16. The method according to claim 14, wherein the determination of the inactivity condition for the first UE is based at least partly on a reception of an indicator of power saving mode (PSM) operation at the first UE, wherein operation in the PSM includes refraining from reception of messages during a PSM time period.

17. The method according to claim 14, wherein the determination of the inactivity condition for the first UE is based at least partly on a reception of an indicator, from an Evolved Node-B (eNB), of an expiration of an inactivity timer for the first UE.

18. User Equipment (UE) to support Machine Type Communication (MTC) in accordance with an Evolved Packet System (EPS) bearer, the UE comprising
a memory;
interfaces configured to communicate with an Evolved Node-B (eNB);
hardware processing circuitry in communication with the memory and via the interfaces configured to:
transmit, for reception via the eNB and at a Mobility Management Entity (MME) that supports an EPS bearer between the UE and a Packet Data Network Gateway (PGW), an indicator of Machine Type Communication (MTC) operation that indicates that the UE operates as an MTC UE, wherein the indicator of MTC operation enables a release of an S5/S8 bearer between a Serving Gateway (SGW) and the PGW; and
transmit to the eNB an indicator of power saving mode (PSM) operation for a determination of UE inactivity, operation in the PSM comprising refraining from reception of messages during a PSM time period,
wherein the EPS bearer includes the S5/S8 bearer, a radio bearer between the UE and an Evolved Node-B (eNB), and an S1 bearer between the eNB and the SGW.

19. The UE according to claim 18, wherein the S5/S8 bearer is released in response to a determination of UE inactivity on the EPS bearer.

20. The UE according to claim 18, wherein the S5/S8 bearer is released in response to a release of the radio bearer or a release of the S1 bearer.

21. The UE according to claim 18, wherein the indicator of MTC operation is transmitted as part of a UE attachment procedure for the EPS bearer.

22. The UE according to claim 18, wherein the indicator of MTC operation includes a permission indicator for releasing the S5/S8 bearer as part of the operation of the EPS bearer.

23. The UE according to claim 18, wherein the indicator of MTC operation includes an indicator of transmission of small blocks of data or transmission at an infrequent rate, wherein a small block of data includes 1000 bytes of data or fewer and the infrequent rate is less than once per minute.

24. The UE according to claim 18, the hardware processing circuitry further configured to transmit an indicator of power saving mode (PSM) operation at the UE, wherein operation in the PSM includes refraining from reception of messages during a PSM time period.

25. The UE according to claim 24, wherein the indicator of PSM operation includes a PSM timer parameter that reflects a future time for UE operation in the PSM mode.

26. The UE according to claim 18, wherein the transmission of the indicator of MTC operation is performed as part of a re-establishment process in response to a release of the S5/S8 bearer and a determination that uplink data is to be transmitted on the EPS bearer.

* * * * *

UNITED STATES PATENT AND TRADEMARK OFFICE
CERTIFICATE OF CORRECTION

PATENT NO. : 9,603,186 B2
APPLICATION NO. : 14/571025
DATED : March 21, 2017
INVENTOR(S) : Jain et al.

Page 1 of 1

It is certified that error appears in the above-identified patent and that said Letters Patent is hereby corrected as shown below:

In the Claims

In Column 18, Line 8, in Claim 14, delete "bearer" and insert --bearer,-- therefor In Column 18, Line 26, in Claim 18, delete "comprising" and insert --comprising:-- therefor Signed and Sealed this
Twenty-eighth Day of May, 2019

Andrei Iancu
*Director of the United States Patent and Trademark Office*